Nov. 26, 1929.  L. F. HANES  1,737,498
HEAT DISTRIBUTOR FOR COOKING VESSELS

Filed April 21, 1928

L. F. Hanes
INVENTOR

BY Victor J. Evans
ATTORNEY

Patented Nov. 26, 1929

1,737,498

UNITED STATES PATENT OFFICE

LEWIS FRANCIS HANES, OF GREENSBORO, NORTH CAROLINA

HEAT DISTRIBUTOR FOR COOKING VESSELS

Application filed April 21, 1928. Serial No. 271,901.

The present invention relates to a heat equalizer for cooking vessels. A source of considerable trouble in applying heat in cooking arises from the unequal distribution of heat from the heating unit or stove, which is commonly gas or electricity, generally with the former in the shape of an annular multi-jet burner. In all these cases the central portions at which the high heat is applied—due to defective radiation produces an interior zone of very high temperature, which reacts on the bottom surface of the cooking vessel and unless there is an abundance of water in the vessel to dispose of the unequal zones of heat by convection burns the food at the central part while the outer parts of the vessel are improperly heated. Moreover, the localization of the heat at the central portions is sufficient to burn out the bottoms of the vessels, especially fusible material such as aluminum ware, all of which is due to the peripheral parts of the heating medium being relatively much cooler than the interior portion, since however well conductive the material of the stove may be, the radiation cannot effect uniform distribution of the heat.

I correct this trouble by providing a plate preferably casting of iron upon the upper surface of which the cooking vessel may be applied and induce a steam of air thru channels formed in the face of the plate or in its body and thereby induce a draft thru the body of the plate which equalizes the temperature and renders the interior part of substantially the same temperature as the peripheral parts. The device may be round or of other plate-form, in which the channels for conveying the air take a circuitous path so as to give it even distribution for its contact with the channel walls and when the cooking vessel is applied over the plate the high central zone of heat produces a chimney effect inducing a draft from the zone of high heat to the peripheral portions thereby effecting an equal heating effect on the contents of the cooking vessel.

I provide openings in the wall at the periphery, a series of vents by which the air may have ingress and egress to effect air movement thru the plate. The ingress vent is preferably placed on the outer periphery but may also be placed at some convenient point in the high heat area, or in other words approximately central—the distinguishing feature of the invention being that a zig-zag or circuitous path is afforded for the air and caused by unequal temperatures to effect a draft and equalize the heating of the plate.

The invention therefore comprises a plate provided with a circuitous path for flow of air thru the body of the plate to equalize its temperature. It comprises other more specific features the novelty of which will be hereinafter described and will be definitely indicated in the accompanying claim.

In the accompanying drawings illustrating the invention—

Figure 1:
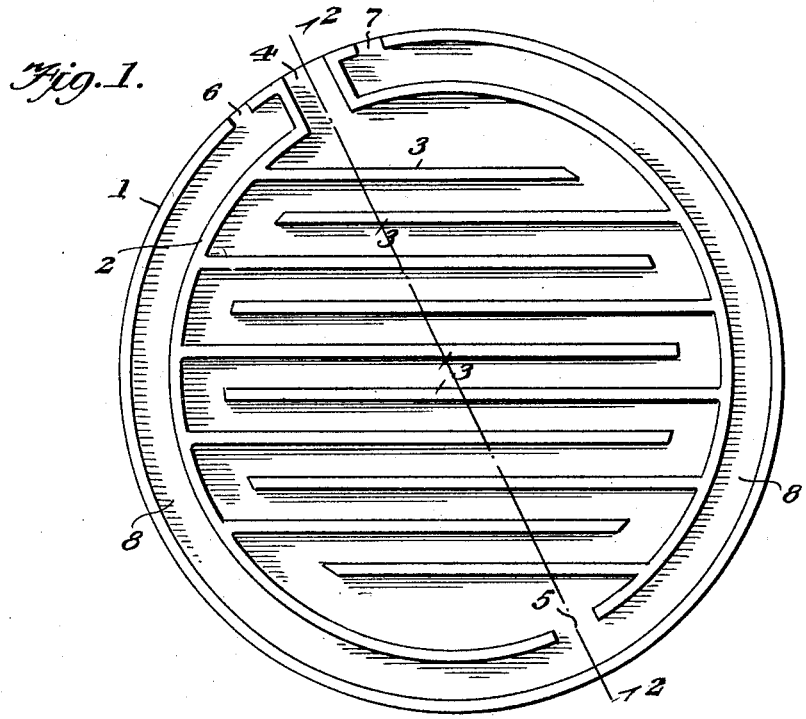
Figure 1 is a diagrammatical illustration of a plate embodying one form of my invention—
Figure 2:
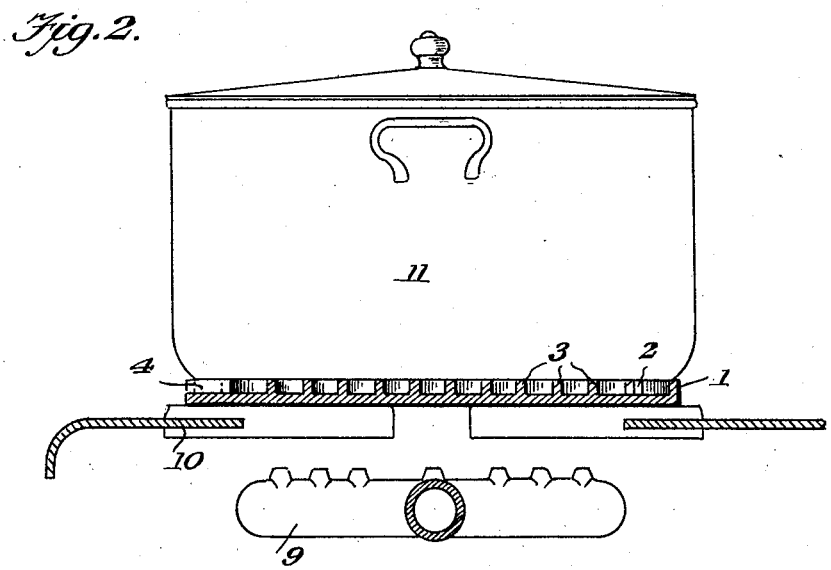
Figure 2 is an elevation of the same part in section with a superposed cooking vessel.

Referring now in detail to the drawings—1 represents a plate, which may be in the form of an iron casting, in this case shown in circular form and which has at its periphery a pair of ribs 1 and 2, forming a passage for the distribution of air around the periphery of the plate with an inlet port 4 for the air and outlet ports 6—7. Within the rib 2 are formed series of salient baffles 3 connecting alternately with the two sides of the circular wall 2 and by which the air is caused to pass in a zig-zag path thru-out the body of the plate and find a vent at the outlet port 5 to afford communication with the passageway 8 formed by the ribs 1 and 2. The air then passes through the passageway 8 to vents 6—7 formed in the outer rib upon opposite sides of the port 4. The reference numeral 9 represents an annular gas burner provided with series of distributed jets in an usual form of construction and 10 the surface of a gas-range, upon which the equalizing plate is placed. 11 represents a cooking vessel superposed on the plate and thereby covering the open ribbed surface of the plate already described. As thus described the central portions of the plate become much more highly heated than the peripheral portions and the air in expanding seeks to find an outlet. The port 4 being of much larger area than the ports 6—7 will induce at the face of the plate a stream of hot air entering at the point 4 and discharging at the points 6—7 and the flow of air across the baffled surface 3 will render the body of the plate at a uniform temperature so that the central portion of the cooking vessel receives substantially the same degree of heat as the outer portion.

The invention of course is not limited in application to a source of heat due to a gas range but may be equally applied in a case of an electrically heated plate, and moreover the point of ingress for the air need not necessarily be located as shown in the drawing at the periphery, but may be applied at some other point of the casting or other plate to afford an effective circulation of air.

Having thus described my invention, what I claim is new and desire to secure by Letters Patent, is:—

A stove attachment for cooking vessels comprising a plate, a pair of ribs rising from the plate in spaced relation to each other with one rib at the outer edge of the plate and the other rib inwardly of the edge to provide with each other an air passageway about the edge, baffles rising from the plate in spaced relation with respect to each other and extending inwardly from opposite walls of the inner rib, said baffles being formed with the wall they extend from but disposed in spaced relation to the opposite wall to provide a zigzag air passage, the inwardly rib being formed with an air inlet port extending to the edge of the plate and an air outlet port diametrically opposite the inlet port, said outlet port connecting with the first mentioned air passage, and the other rib being formed with air outlet ports upon opposite sides of the inlet port of the inner rib.

In testimony whereof I affix my signature.

LEWIS FRANCIS HANES.